United States Patent
Tomono et al.

(10) Patent No.: US 6,539,823 B1
(45) Date of Patent: Apr. 1, 2003

(54) PEDAL ASSEMBLY SUPPORTING STRUCTURE FOR AUTOMOBILE

(75) Inventors: Kazunori Tomono, Hiroshima (JP); Shuji Sanagi, Hiroshima (JP); Kouki Makino, Hiroshima (JP); Keisuke Miyoshi, Hiroshima (JP); Hideaki Tanaka, Hiroshima (JP); Kazutaka Ishikura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/722,012

(22) Filed: Nov. 27, 2000

(30) Foreign Application Priority Data

Dec. 6, 1999 (JP) ............................. 11-346391

(51) Int. Cl.[7] .......................... G05G 1/14; B60K 28/14
(52) U.S. Cl. ........................................ 74/512; 180/274
(58) Field of Search .................... 74/512, 513, 478; 180/274, 271

(56) References Cited

U.S. PATENT DOCUMENTS

| | | | |
|---|---|---|---|
| 5,921,144 A | * 7/1999 | Williams et al. | 180/271 |
| 6,082,219 A | * 7/2000 | Wolpert | 180/274 |
| 6,142,036 A | * 11/2000 | Mizuma et al. | 180/274 |
| 6,176,340 B1 | * 1/2001 | Mizuma et al. | 180/274 |
| 6,276,483 B1 | * 8/2001 | Sinnhuber et al. | 180/271 |
| 6,279,417 B1 | * 8/2001 | Mizuma et al. | 180/274 |
| 6,336,376 B1 | * 1/2002 | Lee | 180/274 |
| 6,339,971 B1 | * 1/2002 | Kato | 180/274 |

FOREIGN PATENT DOCUMENTS

| | | |
|---|---|---|
| EP | 0 847 900 | 6/1998 |
| JP | 9-216528 | 8/1997 |
| JP | 10-250539 | 9/1998 |
| JP | 10-310036 | 11/1998 |
| JP | 11-059351 | 3/1999 |

* cited by examiner

Primary Examiner—David A. Bucci
Assistant Examiner—Julie K. Smith
(74) Attorney, Agent, or Firm—Nixon Peabody LLP; Donald R. Studebaker

(57) ABSTRACT

In a supporting structure for a brake pedal assembly pivotally mounted for rocking motion on the rear surface of a dash panel of an automobile through a first bracket, a front portion of the first bracket is fixed to the dash panel and the rear end thereof is coupled to a second bracket, fastened to a cowl member in a cabin, so as to be disengageable by the application of a load of automobile collision above a predetermined level. The brake pedal assembly is pivotally mounted for rocking motion to the first bracket. At the lower end of the second bracket, a pedal lever stop is provided which abuts against the rear end of the brake pedal assembly when the first and second brackets are disengaged in an automobile collision so that the brake pedal assembly moves backward. The brake pedal assembly is restrained by abutment on the pedal lever stop against backward movement. This ensures to prevent the brake pedal assembly from moving backward in an automobile collision while providing a simple and highly reliable structure.

7 Claims, 3 Drawing Sheets

PEDAL ASSEMBLY SUPPORTING STRUCTURE FOR AUTOMOBILE

FIELD OF THE INVENTION

This invention relates to a supporting structure for a pedal assembly for use with an automobile.

DESCRIPTION OF THE PRIOR ART

In automobile collisions (head-on collisions), as is often the case, an automobile cannot fully be stopped even though the driver brakes the automobile by stepping on a brake pedal for the purpose of avoidance of a collision, resulting in the collision, namely, the automobile leads to the collision with the brake pedal trod.

In such a case, a front car body goes to collapse while absorbing energy of the collision, and an engine placed in an engine room goes backward while pushing a master cylinder of a brake system located to the rear of the engine. During the time, since a brake pedal lever located to the rear of a dash panel is connected to the master cylinder through an operating rod, the brake pedal is also pushed backward through the operating rod with the backward movement of the master cylinder. As a result, a load of automobile collision acts on the driver's foot with which the driver has stepped on the brake pedal until immediately before the collision to produce a large kick back, thereby applying an impact to the driver's knee.

To cope with this problem, various countermeasures have been conventionally proposed. For example, in a structure disclosed in Japanese Unexamined Patent Publication No. 9-216528, a rocking link is supported to a pedal bracket fixed to a dash panel through a fixed pin extending widthwise of an automobile for rocking motion around the fixed pin, and a brake pedal lever is connected and supported to the rocking link through a rotating pin extending therefrom widthwise of the automobile. And, a spring is bridged between the rocking link and an instrument panel member as a car body member located in a cabin so as to pass above the fixed pin and urge the rocking link into backward rocking motion. Furthermore, an abutment is provided for abutting against the rocking link having moved backward together with the pedal bracket by a collision. When the pedal bracket moves backward by the collision, the rocking link as a support member for the brake pedal lever abuts against the abutment of the instrument panel member and then drops out of the abutment while rocking frontward. In this manner, a brake pedal at the lower end of the brake pedal lever is held against backward movement, thereby preventing a load of automobile collision from being applied to the driver's knee through the brake pedal.

In the conventional structure mentioned above, however, it is necessary to additionally provide the abutment which can abut against the rocking link. Further, the spring for urging the rocking link into rocking motion must be disposed. These additional members involve complicated structure and high price.

Furthermore, it is difficult for the rocking link to precisely abut against the abutment and drop out of the abutment while rocking frontward in an automobile collision. Therefore, the conventional structure has poor operational reliability.

An object of the present invention is to improve the supporting structure for a pedal assembly such as a brake pedal assembly disposed to the rear of a dash panel, and more specifically to reinforce and simplify the pedal assembly supporting structure for use with an automobile while preventing the pedal as far as possible from moving backward in an automobile collision to provide enhanced operational reliability.

SUMMARY OF THE INVENTION

To attain the above object, in the present invention, a first bracket pivotally mounting a pedal lever is disengageably connected to a second bracket fixed to a car body member in a cabin so that when a load of automobile collision above a predetermined level is applied to the first bracket in an automobile collision, the first bracket is disconnected from the second bracket to come into a cantilevered condition and the pedal lever supported to the first bracket is caused to abut against a pedal lever stop provided on the second bracket. This prevents the pedal lever itself from moving backward.

More specifically, the present invention is directed to a supporting structure for a pedal assembly disposed to the rear of a dash panel of an automobile. This structure includes a first bracket fixed to the dash panel, a second bracket fixed to a car body member in a cabin and connected at a front end thereof to a rear portion of the first bracket so as to be disengageable by a load of automobile collision above a predetermined level, and the pedal assembly pivotally mounted for rocking motion to the first bracket. Further, the second bracket is provided with a pedal lever stop for abutting against the pedal assembly moving backward by an automobile collision to restrain further backward movement of the pedal assembly.

With the above structure, the first bracket pivotally mounting the pedal assembly is supported to the dash panel and connected at its rear end to the second bracket, and the second bracket is fixed to the car body member in the cabin. Therefore, in a normal condition, the first and second brackets are held in unitary relation with each other and the pedal assembly is supported to the first bracket being in unitary relation with the second bracket. In this manner, the bearing strength for the pedal assembly can be ensured.

In contrast, when a load of automobile collision above a predetermined level is applied to the car body in an automobile collision, an engine of the automobile is pushed backward by the load of automobile collision thereby moving the dash panel, a cylinder and the like backward. The first bracket fixed to the dash panel is also moved backward so that the first bracket is disconnected from the second bracket. In this case, since the second bracket is provided with the pedal lever stop, when the first bracket is disengaged from the second bracket and starts backward movement together with the pedal assembly, the pedal assembly abuts against the pedal lever stop thereby preventing further backward movement of the pedal assembly. Therefore, in an automobile collision, even if the first bracket moves backward with the progress of deformation of the dash panel, the pedal assembly itself does not produce the same backward movement as the first bracket. Accordingly, it can be prevented that the load of automobile collision acts on the driver's knee with which the driver steps on the pedal.

Furthermore, since the inventive pedal assembly supporting structure is such a simple structure that the first bracket is fixed to the dash panel, the pedal assembly is mounted for rocking motion to the first bracket and the rear portion of the first bracket is connected to the second bracket fixed to the car body member in the cabin, the structure can be extremely simplified and reduced in cost, as compared with the conventional structure in which the rocking link supporting the pedal assembly abuts against the abutment of the car body member and thereby rocks.

Preferably, a rod associated with a cylinder located forward of the dash panel is connected to the pedal assembly, and the axial direction of the rod forms a predetermined angle with a direction parallel to a seating face of the second bracket with which the second bracket is mounted to the car body member.

Since the direction of input of a load to the pedal assembly from the rod associated with the cylinder is thus different from the direction parallel to the seating face of the second bracket with which it is mounted to the car body member, when the first bracket moves backward with the progress of deformation of the dash panel in an automobile collision, it can be avoided that the connection between the first and second brackets are kept unreleased to move the pedal assembly backward while deforming the second bracket. Accordingly, the above effects in a collision can be surely obtained.

The rear portion of the first bracket may be connected to the second bracket so as to disengage therefrom while rocking backward on a fulcrum on the pedal lever stop when the pedal assembly abuts against the pedal lever stop by an automobile collision.

With this structure, even if the rear end of the pedal assembly abuts against the pedal lever stop of the second bracket prior to disengagement of the coupling between the first and second brackets during the backward movement of the first bracket with the progress of deformation of the dash panel in an automobile collision, the rear portion of the first bracket is pushed backward while rocking backward together with the pedal assembly on the fulcrum on the pedal lever stop. Therefore, the first bracket surely disengages from the second bracket, and thereafter, in the same manner as described above, the pedal assembly itself is restrained by abutment on the pedal lever stop against further backward movement. Accordingly, it can be prevented that a load of automobile collision is applied to the knee of the driver who has stepped on the pedal in an automobile collision.

A sensor means for sensing an operated condition of the pedal assembly may be attached to the pedal lever stop of the second bracket. In this case, cost reduction can be achieved by using a mounting member for the sensor means also as the pedal lever stop.

The pedal assembly is preferably a brake pedal assembly. In this case, there can be provided a pedal assembly optimally exerting the effects of this invention.

DESCRIPTION OF THE PREFERRED EMBODIMENT

Figure 1:
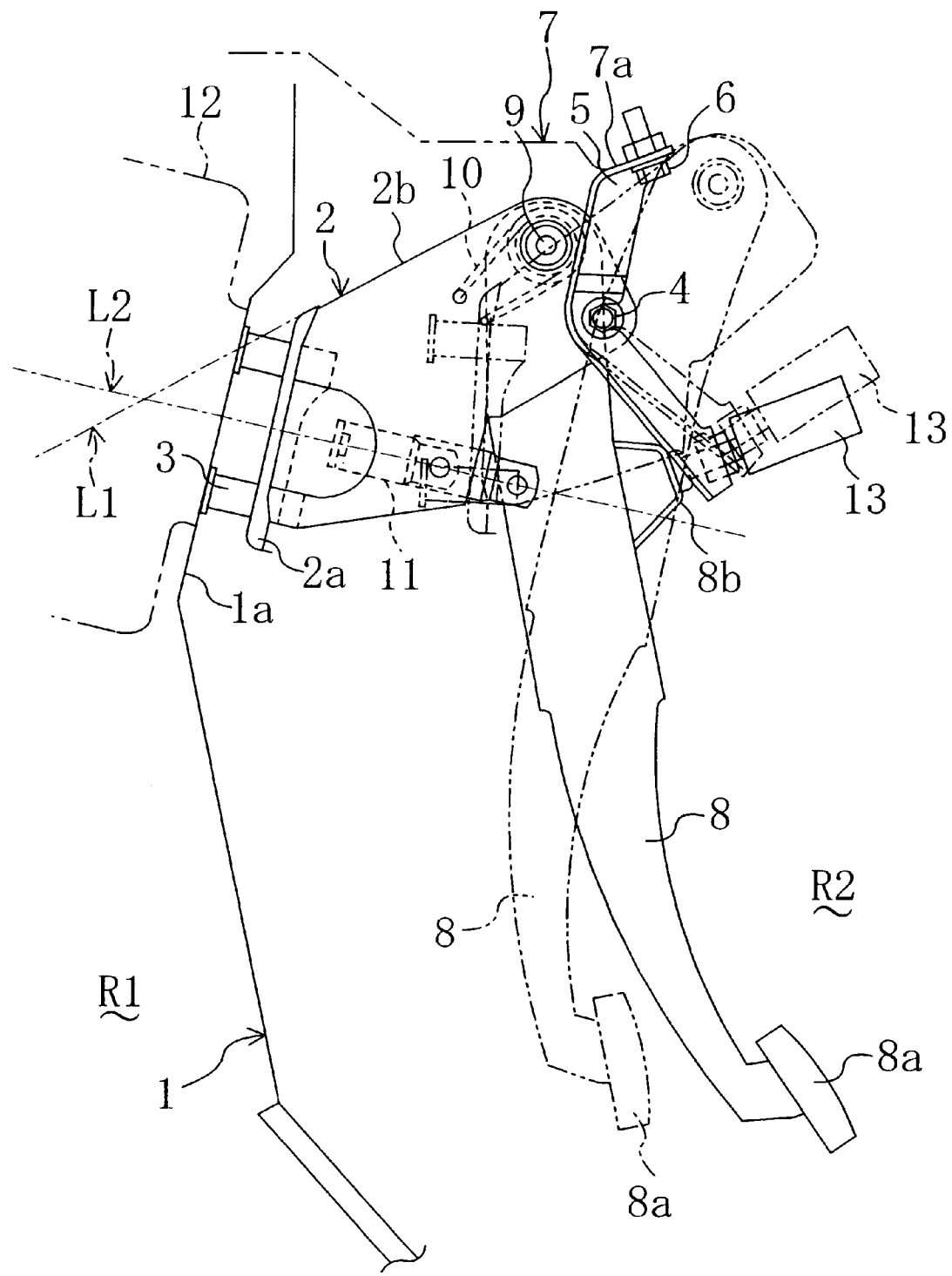
FIG. 1 is a side view showing a pedal assembly supporting structure according to an embodiment of the present invention.

Hereinafter, description will be made about a pedal assembly supporting structure for use with an automobile according to an embodiment of the present invention with reference to the drawing. FIG. 1 shows an entire structure of the embodiment of the present invention. A dash panel 1 constituting part of a car body of an automobile separates an engine room R1, located toward the front thereof (left side of the figure), for accommodating an unshown engine, and a cabin R2 located toward the rear thereof (right side of the figure). A brake pedal assembly 8 operated by a stepping action of a driver seating on a driver's seat (not shown) is disposed to the rear of a lower portion of the dash panel 1, i.e., at the front end of a lower space in the cabin R2.

More specifically, the dash panel 1 is formed with an inclined portion 1a inclining frontward in a direction from top to bottom of the automobile, and a first bracket 2 is fixed to the rear side of the inclined portion 1a with bolts 3, 3, . . . The first bracket 2 includes a fixing part 2a of rectangular plate shape mounted in parallel relation to the inclined portion 1a of the dash panel and spaced a predetermined distance away therefrom, and a pair of parallel support parts 2b, 2b extending upwardly toward the rear from the fixing part 2a. Rear-end lower portions of the pair of support parts 2b, 2bare coupled to a second bracket 5 described later with respective bolts 4 passing through the pair of support parts 2b, 2b laterally (widthwise of the automobile). A middle portion of the fixing part 2a is formed with an opening (not shown) in which an operating rod 11 described later is inserted.

A pedal support pin 9 extending laterally (widthwise of the automobile) is bridged between upper end portions of both the support parts 2b, 2b of the first bracket 2. The brake pedal assembly 8 is pivotally supported at its upper end to the pedal support pin 9 for rocking motion along a vertical plane. The brake pedal assembly 8 includes a pedal lever as a main portion having the shape of an elongated plate, a pedal 8a which is provided at the lower end of the pedal lever and on which the driver steps, and a projection 8b which is provided on the rear side of a vertically intermediate portion of the pedal lever.

A coil spring 10 as a bias means is carried on the pedal support pin 9, anchored at one end thereof to the vertical wall of one of the support parts 2b of the first bracket 2 and anchored at the other end to the brake pedal assembly 8. The coil spring 10 normally urges the brake pedal assembly 8 into rocking motion in a direction to move the pedal 8a toward the rear of the automobile, i.e., counterclockwise in FIG. 1.

An intermediate portion of the brake pedal assembly 8, more specifically, a portion thereof closer to its upper end than its vertically middle portion, is connected to an operating rod 11 (i.e., a rod associated with a master cylinder) which is drivingly connected to the master cylinder (not shown) of the brake system through a master back (serve unit) 12 located at the rear end of the engine room R1. The operating rod 11 extends so as to be substantially orthogonal to the inclined portion 1a of the dash panel 1, and the front end thereof passes through the opening of the fixing part 2a of the first bracket 2 and an opening (not shown) formed through the inclined portion 1a of the dash panel 1 and is then connected to the master back 12 located at the rear end of the engine room R1. When the driver steps on the pedal 8a of the brake pedal assembly 8 to rock the brake pedal lever 8 clockwise as viewed in FIG. 1, the operating rod 11 is pushed frontward to operate the master back 12 and the master back 12 thereby boosts a pressing force against the master cylinder. In this manner, the brake is applied by the master cylinder.

A cowl member 7 is disposed, as a car body member constituting part of the car body, above the first bracket 2 and at the front end of the cabin R2 to extend widthwise of the automobile. The cowl member 7 has a structure which does not move backward for securing a space for passengers in the cabin R2 in an automobile collision (head-on collision) The underside of the cowl member 7 is formed with a mounting part 7a inclining downwardly toward the front, and the upper end of the second bracket 5 is fastened to the mounting part 7a with bolts 6.

Figure 2:
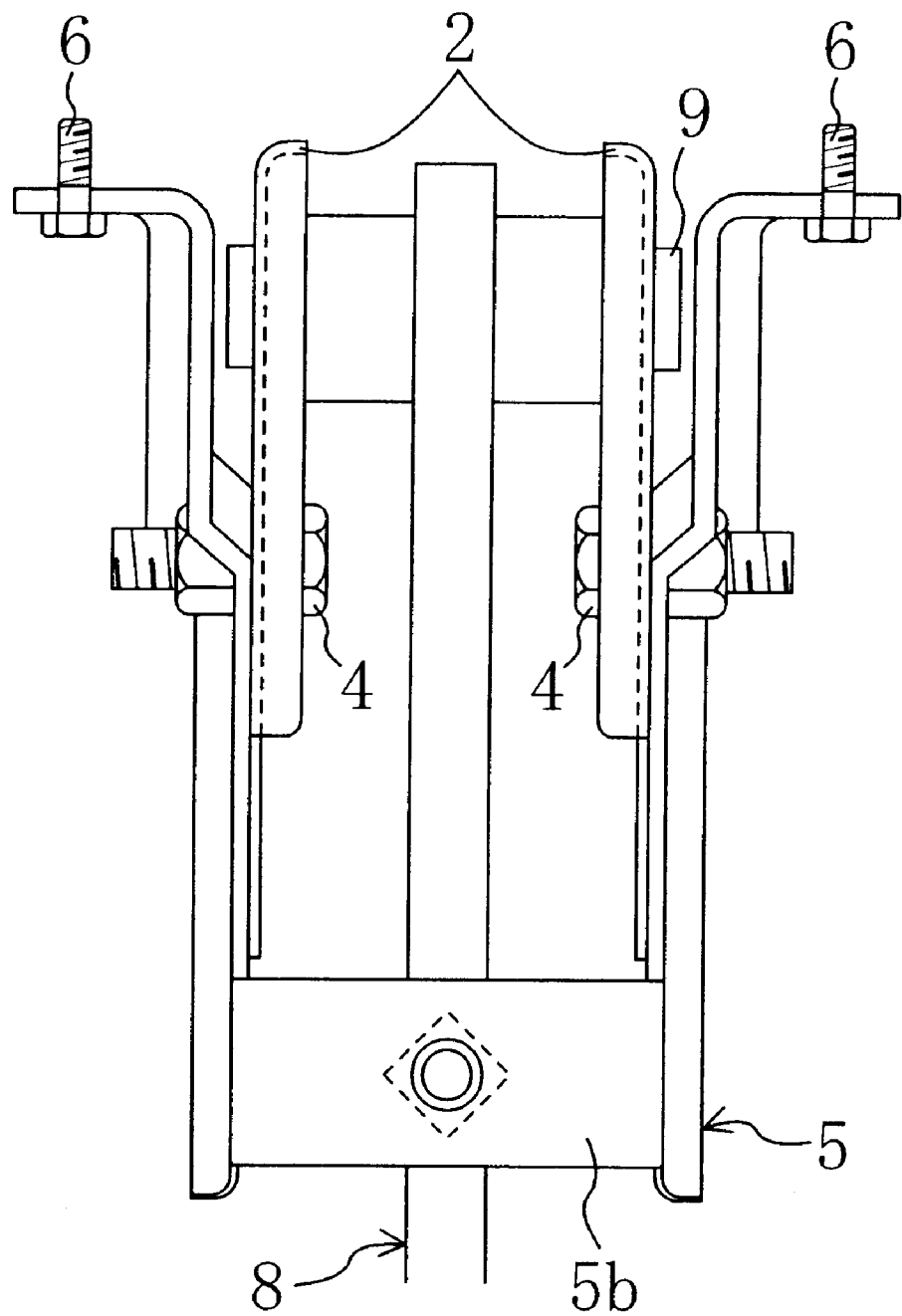
FIG. 2 is a plan view showing in enlarged dimension an essential part of the pedal assembly supporting structure.

The second bracket 5 includes a pair of right and left members each bowed in such substantially an L-shape that its vertically middle portion is located ahead of its upper and lower ends as viewed from the lateral side of the automobile. The upper ends of both the members are formed into outwardly folded portions. In the folded portions, the second bracket 5 is fixedly mounted to the cowl member 7 with the bolts 6. Further, as shown in FIG. 2, the right and left members of the second bracket 5 are connected at their lower rear ends to a pedal lever stop 5b extending widthwise of the automobile. The pedal lever stop 5b, in a normal condition, does not abut against the brake pedal assembly 8, but in an automobile collision, abuts against the rear face of the projection 8b of the brake pedal assembly 8 thereby preventing further backward movement of the brake pedal assembly 8.

Figure 3:
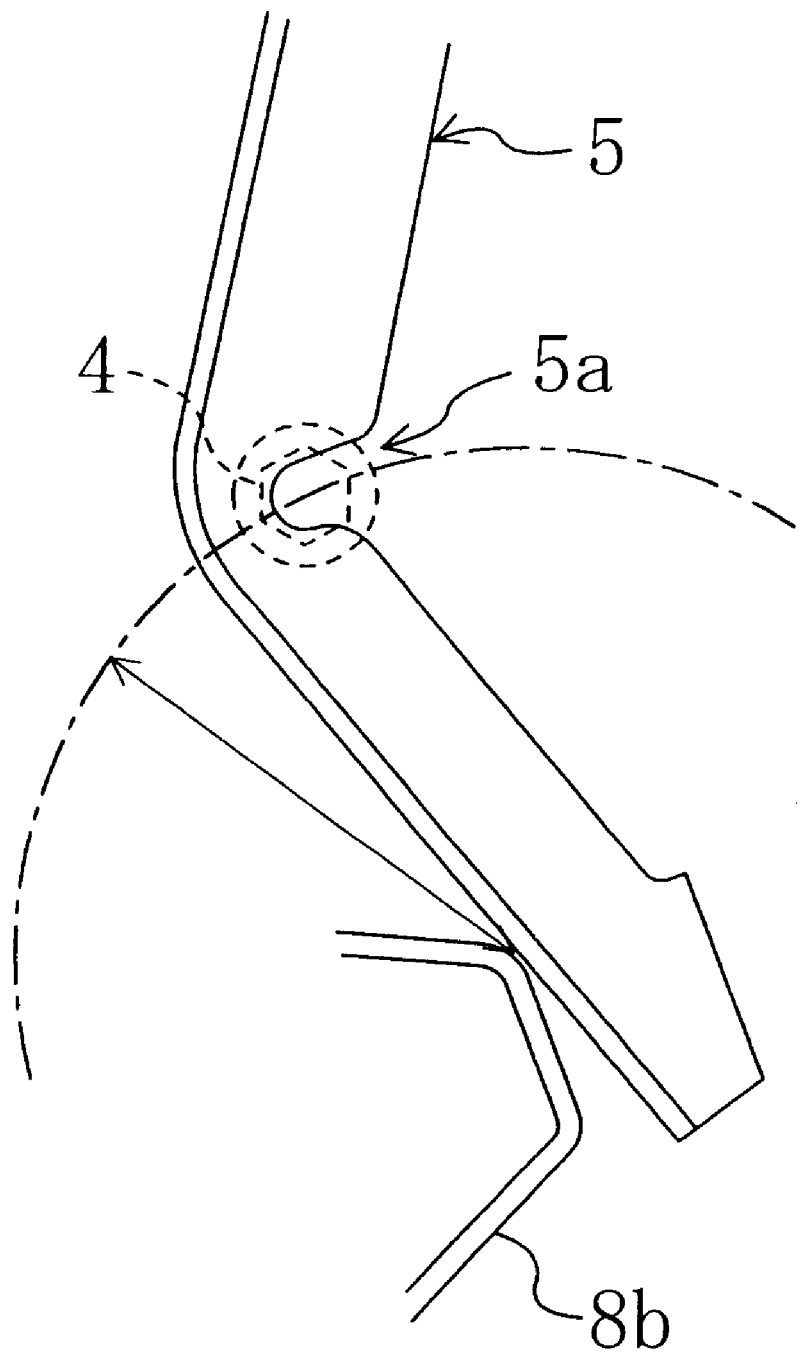
FIG. 3 is a side view showing in enlarged dimension a cutaway of a second bracket.

Both the right and left members of the second bracket 5 are provided with cutaways 5a formed so that vertically middle portions of the rear ends of both the members are cut away rearward. As shown in FIG. 3, the cutaways 5a are formed in an arcuate shape at a point on a circle described about the abutment point of the second bracket 5 against the rear face of the projection 8b of the brake pedal assembly 8. The arrow in FIG. 3 shows the radius of the circle described about the abutment point. The bolts 4 are inserted into the respective cutaways 5a. The second bracket 5 is disengageably connected to the rear portion of the first bracket 2 through the fastening of the bolts 4. Accordingly, when a backward load of automobile collision above a predetermined level is applied to the first bracket 2, the bolts 4 unitary with the first bracket 2 drop out of the cutaways 5a of the second bracket 5 so that the first bracket 2 can be disengaged from the second bracket 5. The abutment point of the second bracket 5 against the brake pedal assembly 8 serves as a fulcrum for backward rocking motion of the first bracket 2 having been disengaged from the second bracket 5. In addition, a cylindrical brake sensor 13 for sensing a stepped condition of the brake pedal assembly 8 is attached to the middle portion of the pedal lever stop 5b of the second bracket 5.

As described so far, the first bracket 2 is fixed at its front end to the dash panel 1, and the rear portion thereof is connected to the second bracket 5 fixed to the cowl member 7. Thus, the brake pedal assembly 8 is constructed so as to be supported to the dash panel 1 and the cowl member 7 through the first and second brackets 2 and 5.

Furthermore, the direction L1 parallel to an upper-end seating face of the second bracket 5 with which the second bracket 5 is mounted to the mounting part 7a of the cowl member 7 forms a predetermined angle θ with the axial direction L2 of the operating rod 11.

Next, operations of this embodiment will be described. In a normal automobile condition that the automobile does not cause a collision, as shown in solid lines in FIG. 1, the front end of the first bracket 2 is fixed to the dash panel 1. On the other hand, the first bracket 2 is unitarily connected at its rear end through the bolts 4 to the second bracket 5 fixed to the cowl member 7 in the cabin. The brake pedal assembly 8 is pivotally mounted for rocking motion to the rear portion of the first bracket 2. For this structure, when the driver operates the brake pedal assembly 8 by stepping on the brake pedal 8a to brake the automobile, the same behavior as normally performed is exhibited. Specifically, the operating rod 11 advances in response to an operation to step on the brake pedal 8a, and a pressing force of the advancing operating rod 11 is boosted by the master back 12 and then transmitted to the master cylinder. A braking pressure is thereby transmitted from the master cylinder to wheel cylinders (not shown) of wheels to brake the automobile.

In contrast, when the automobile causes a collision (head-on collision) as is in its braked condition that the driver continues to step on the brake pedal 8a, the front car body goes backward to collapse. As a result, the engine in the engine room R1 also goes backward and pushes the master cylinder, the master back 12 and the operating rod 11 to move them backward, and the brake pedal assembly 8 connected in unitary relation with the operating rod 11 thereby also starts a backward movement. Further, the dash panel 1 is also moved backward by taking a load of automobile collision above a predetermined level, and the first bracket 2 fixed to the dash panel 1 moves backward. During the time, the second bracket 5 does not move backward since it is fixed to the cowl member 7 which can hold a stopping position without moving backward for securing a space for passengers in the cabin R2 in an automobile collision. Accordingly, the backward movement of the first bracket 2 causes the bolts 4 located at the connection between both the brackets 2, 5 to drop out of the cutaways 5a of the second bracket 5 toward the rear so that both the brackets 2, 5 are disengaged from the connection. The first bracket 2 thereby comes into a cantilevered condition where it is supported to the dash panel 1 alone.

The first bracket 2 further moves backward after the disengagement from the second bracket 5. Therefore, the brake pedal assembly 8 pivotally mounted to the first bracket 2 also moves backward. However, immediately after the backward movement, the brake pedal assembly 8 abuts at the rear face of its projection 8b against the pedal lever stop 5b located on the lower portion of the second bracket 5 and is restrained against further backward movement so as to be pushed back by the pedal lever stop 5b. As a result, as shown in imaginary lines in FIG. 1, even if the dash panel 1 and the first bracket 2 move backward by a large distance, the brake pedal assembly 8 will not produce the like backward movement. Therefore, a large space for the driver's foot can be secured to avoid a load of automobile collision from acting on the knee of the driver who has stepped on the brake pedal 8a.

Furthermore, since the direction L1 parallel to the seating face of the second bracket 5 with which the second bracket 5 is mounted to the cowl member 7 forms the predetermined angle θ with the axial direction L2 of the operating rod 11, when first bracket 2 moves backward with the progress of deformation of the dash panel 1 in an automobile collision, the bolts 4 unitary with the first bracket 2 at the connection between the first and second brackets 2, 5 surely drop out of the cutaways 5a at the rear end of the second bracket 5, thereby disengaging the coupling between both the brackets 2, 5. Therefore, it can be prevented that in an automobile collision, both the brackets 2, 5 move backward together while deforming without their disengagement. This makes it possible to cause the brake pedal assembly 8 to abut against the pedal lever stop 5b of the second bracket 5 while disengaging the coupling of both the brackets 2, 5, which prevents backward movement of the brake pedal assembly 8 with reliability.

Moreover, even if the rear face of the projection 8b of the pedal assembly 8 abuts against the pedal lever stop 5b of the second bracket 5 prior to disengagement of the coupling between the first and second brackets 2, 5 due to the deformation of the dash panel 1 in an automobile collision, the rear portion of the first bracket 2 is pushed backward, by a load of automobile collision, on a fulcrum located at the abutment point of the brake pedal assembly 8 on the pedal lever stop 5b so that the load is applied to the connection of both the brackets 2, 5. This aids in disengagement of both the brackets 2, 5. In addition, the cutaways 5a provided in the second bracket 5 have an angle of disengagement set to disengage the rear portion of the first bracket 2 from the second bracket 5 while backwardly rocking it together with the brake pedal assembly 8 on the fulcrum on the pedal lever stop 5b. Accordingly, in an automobile collision, the coupling between both the brackets 2, 5 can surely be disengaged and the load of automobile collision can be prevented from being applied to the driver's knee.

Further, since the brake sensor 13 for sensing a stepped condition of the brake pedal assembly 8 is provided in the pedal lever stop 5b of the second bracket 5, cost reduction can be achieved by using a mounting member for the brake sensor 13 also as the pedal lever stop 5b.

In addition, this embodiment has such a structure that the front end of the first bracket 2 is fixed to the dash panel 1, the rear end of the first bracket 2 is connected to the second bracket 5 fixed to the cowl member 7 and the coupling between both the brackets 2, 5 is disengaged when a load above a predetermined level is applied thereto in an automobile collision. Therefore, the structure of this embodiment exhibits higher operational reliability in an automobile collision as compared with the conventional structure that rocks the rocking link for supporting the brake pedal lever by causing it to abut against the abutment of the instrument panel member. Further, since the structure of this embodiment is far simpler than the conventional structure, it offers price advantage.

Although the pedal assembly used in the above embodiment is the brake pedal assembly 8, any pedal assembly is applicable to this invention so long as it is disposed for rocking motion to the rear of the car dash panel 1 and coupled to the operating rod 11.

Each mechanism of the first and second brackets 2, 5 is not limited to that as described in the above embodiment, and the essential is that both the brackets are adapted to disengage in an automobile collision.

What is claimed is:

1. A pedal assembly for connection to a dash panel of an automobile, said pedal assembly comprising:
   a support structure for connecting said pedal assembly to the dash panel, said support structure including:
      a first bracket having a first end and a second end, said first end being fixedly connected to the dash panel, and having right and left vertical support walls spaced apart in the widthwise direction of the automobile;
      a second bracket having a first end fixedly connected to an automobile body member and a second end disengageably connected to said second end of said first bracket, and having right and left vertical support walls positioned, in a spaced apart widthwise direction of the automobile, to have portions of each right and left vertical support wall in overlapping relation to respective portions of the right and left vertical support walls of the first bracket wherein the second end of the second bracket is disengageably connected to said second end of said first bracket at the overlapped portions of the right and left vertical support walls; and
      a coupling member for disengageably connecting in a widthwise direction of the automobile said second end of said second bracket to said second end of said first bracket at the overlapped portions of the right and left vertical support walls, said coupling member being adapted to permit said second bracket to travel a distance less than a distance traveled by said first bracket during a collision of the automobile yet permit said first bracket to disengage from said second bracket upon said first bracket receiving a load above a predetermined level during the collision of the automobile;
   a pedal mechanism including a pedal arm having an upper end pivotally mounted to said first bracket for pivotal motion relative to the dash panel, and a pedal member mounted at a distal end of said pedal arm for manipulation by a driver of the automobile,
   wherein each of said spaced apart right and left vertical support walls of the second end of the second bracket includes a lower end portion beneath the coupling member and wherein a pedal lever stop formed by a member extending between the spaced apart lower end portions of the right and left vertical support walls of the second bracket is adapted to be engaged by said pedal arm only during a collision of the automobile to prevent movement of said pedal mechanism in a backward direction relative to the dash panel.

2. The pedal assembly as claimed in claim 1, wherein a rod associated with a cylinder located forward of the dash panel is connected to the pedal assembly, and
   the axial direction of the rod forms a predetermined angle with a direction parallel to a seating face of the second bracket with which the second bracket is mounted to the car body member.

3. The pedal assembly as claimed in claim 1, wherein said second end of the first bracket is connected to said second end of the second bracket so as to disengage therefrom while rocking backward on a fulcrum on the pedal lever stop when the pedal arm abuts against the pedal lever stop during an automobile collision.

4. The pedal assembly as claimed in claim 2, wherein said second end of the first bracket is connected to said second end of the second bracket so as to disengage therefrom while rocking backward on a fulcrum on the pedal lever stop when the pedal arm abuts against the pedal lever stop during an automobile collision.

5. The pedal assembly as claimed in any one of claims 2 through 4, further comprising a sensor means for sensing an operated condition of the pedal assembly, said sensor means being attached to the pedal lever stop.

6. The pedal assembly as claimed in any one of claims 2 through 4, wherein the pedal assembly is a brake pedal assembly.

7. The pedal assembly as claimed in claim 5, wherein the pedal assembly is a brake pedal assembly.

* * * * *